US009975278B2

(12) United States Patent
Rabiser et al.

(10) Patent No.: US 9,975,278 B2
(45) Date of Patent: May 22, 2018

(54) DEVICE FOR DEGASSING POLYMER MELTS

(71) Applicant: Brückner Maschinenbau GmbH & Co. KG, Siegsdorf (DE)

(72) Inventors: Bernhard Rabiser, Inzell (DE); Rainer Schwuchow, Nußdorf (DE)

(73) Assignee: BRÜCKNER MASCHINENBAU GMBH & CO. KG, Siegsdorf (DE)

( * ) Notice: Subject to any disclaimer, the term of this patent is extended or adjusted under 35 U.S.C. 154(b) by 453 days.

(21) Appl. No.: 14/759,524

(22) PCT Filed: Dec. 5, 2013

(86) PCT No.: PCT/EP2013/003683
§ 371 (c)(1),
(2) Date: Jul. 7, 2015

(87) PCT Pub. No.: WO2014/108154
PCT Pub. Date: Jul. 17, 2014

(65) Prior Publication Data
US 2015/0343672 A1    Dec. 3, 2015

(30) Foreign Application Priority Data

Jan. 10, 2013  (DE) .................. 10 2013 000 316

(51) Int. Cl.
*B01D 19/00*     (2006.01)
*B29C 37/00*     (2006.01)
(Continued)

(52) U.S. Cl.
CPC .......... *B29C 37/006* (2013.01); *B01D 5/0012* (2013.01); *B01D 19/0073* (2013.01);
(Continued)

(58) Field of Classification Search
None
See application file for complete search history.

(56) References Cited

U.S. PATENT DOCUMENTS

| 3,933,575 A | | 1/1976 | Guth et al. | |
|---|---|---|---|---|
| 4,570,702 A | * | 2/1986 | Stafford ............... | B01D 5/0012 122/367.3 |

(Continued)

FOREIGN PATENT DOCUMENTS

| CN | 202024631 | 11/2011 |
|---|---|---|
| CN | 202174730 | 3/2012 |

(Continued)

OTHER PUBLICATIONS

Translation of JPH06190897, dated Nov. 6, 2017.*
(Continued)

*Primary Examiner* — Amber R Orlando
*Assistant Examiner* — Phillip Y Shao
(74) *Attorney, Agent, or Firm* — Nixon & Vanderhye P.C.

(57) ABSTRACT

An improved device for degassing polymer melts is characterised by, inter alia, the following features: the at least one vacuum separator comprises cooling pipes extending parallel to each other in the tank interior of the vacuum separator housing, the cooling pipes are double-walled, the cooling pipes end at a distance above a collection chamber or above the tank bottom of the vacuum separator housing, and a cleaning device having a scraper or a wiper is provided, said cleaning device being adapted to the cross-sectional shape of the cooling pipes and preferably to the course of the inner wall of the vacuum separator housing and being movable at least in a partial height at least to the lower end of the cooling pipes.

17 Claims, 4 Drawing Sheets

(51) Int. Cl.
*B01D 5/00* (2006.01)
*B29B 7/84* (2006.01)
*B29C 47/76* (2006.01)
*B29C 47/08* (2006.01)

(52) U.S. Cl.
CPC .............. *B29B 7/84* (2013.01); *B29C 47/767* (2013.01); *B29C 47/0877* (2013.01)

(56) References Cited

U.S. PATENT DOCUMENTS

| | | | | |
|---|---|---|---|---|
| 4,664,601 | A | * | 5/1987 | Uchida ................... F04C 28/06 417/27 |
| 2004/0245084 | A1 | * | 12/2004 | Bethge ................... B01D 1/065 202/172 |
| 2006/0230932 | A1 | * | 10/2006 | Thielert ............... B01D 5/0012 95/228 |
| 2008/0018011 | A1 | | 1/2008 | Gregg et al. |

FOREIGN PATENT DOCUMENTS

| | | |
|---|---|---|
| DE | 34 07 104 | 9/1985 |
| DE | 44 24 779 | 1/1996 |
| DE | 196 53 613 | 6/1998 |
| DE | 10 2008 031 834 | 1/2010 |
| EP | 0 237 723 | 9/1987 |
| EP | 0 748 674 | 12/1996 |
| GB | 375132 | 6/1932 |
| GB | 943350 | 12/1963 |
| JP | 52-65561 | 5/1977 |
| JP | 53-28020 | 8/1978 |
| JP | 59-103735 | 6/1984 |
| JP | 6-190897 | 7/1994 |
| JP | H07-328301 | 12/1995 |
| JP | 9-57822 | 3/1997 |
| JP | 2004-098378 | 4/2004 |
| JP | 2004-113926 | 4/2004 |
| JP | 2005-134079 | 5/2005 |
| WO | WO 2004/080691 | 9/2004 |
| WO | WO 2008/110834 | 9/2008 |
| WO | WO 2009/065384 | 5/2009 |

OTHER PUBLICATIONS

Translation of WO2009065384, dated Nov. 6, 2017.*
International Search Report for PCT/EP2013/003683 dated Apr. 2, 2014, six pages.
Written Opinion of ISA for PCT/EP2013/003683 dated Apr. 2, 2014, six pages.
International Preliminary Report on Patentability issued in PCT/EP2013/003683 dated Jul. 14, 2015.
Partial Translation of Chinese Search Report issued in App. No. 201380070024.8 dated Jun. 30, 2016.

* cited by examiner

DEVICE FOR DEGASSING POLYMER MELTS

This application is the U.S. national phase of International Application No. PCT/EP2013/003683 filed 5 Dec. 2013 which designated the U.S. and claims priority to DE Patent Application No. 10 2013 000 316.4 filed 10 Jan. 2013, the entire contents of each of which are hereby incorporated by reference.

The invention relates to a device for degassing polymer melts according to the preamble of claim 1.

The invention relates in particular to a method for degassing polymer melts for the purpose of continuous post-processing to form drawn polymer films, wherein a preferably granular, solid plastics material to be processed is melted by a plasticising unit (extruder), preferably one or more liquid or solid additives are added to the plastics material, and the mixture of molten plastics material and additives is degassed in one or more vacuum regions of the plasticising unit, which regions are connected to a vacuum system.

Degassing methods and devices are in particular known and used in the field of extrusion.

Granular plastics material is melted in a plasticising unit and mixed with one or more liquid or solid additives (e.g. plasticisers, lubricants, antistatic agents, etc.) depending on the relevant properties of the final plastics product.

Following melting, the polymer melt thus produced contains, in its interior, gaseous occlusions and dissolved liquid substances which would impair the quality of the final product if the melt were to be processed in this form. Occlusions would have a very detrimental effect on the production of plastics films. Therefore, in the plasticising unit a degassing process in a vacuum region normally follows the melting of the plastics material and the mixing of the additive(s), before the melt is withdrawn by means of a discharge unit.

For this purpose, use is made of a vacuum system connected to the degassing region (vacuum region). In the vacuum system, a vacuum pump set generates a vacuum which can act on the vacuum region by means of corresponding pipelines and causes interference gases, decomposition products of polymers and additives, and impurities to be removed from the melt.

The aim of the degassing is also to remove water (in the form of water vapour) and non-crosslinked plastics molecules (residual monomers) from the melt.

In the long term, these gaseous and sometimes also liquid constituents, which are extracted from the plasticising unit by means of a vacuum, damage the vacuum unit, thereby considerably reducing the service life and availability of various components. The cleaning and maintenance requirements increase substantially, and occasional machine failures are inevitable. Lastly, it is difficult to dispose of these substances and machine components.

The damage to the vacuum unit and the associated components, such as the pipelines, valves and sensors, as well as the dirt therein are caused by the separated substances reacting with each other and being deposited on the surfaces for reasons of thermodynamics.

PRIOR ART

To lessen the severity of the aforementioned drawbacks, various separation mechanisms and devices are known in the prior art.

DE 44 24 779 A1 proposes in particular extracting process oil from the vacuum. In the process, gas to be condensed originating from the extrusion process is guided via a pipeline to a solids separator in which coarse impurities and residual monomers (oligomers) are separated. In a condensate separator, constituents of the gas that are in vapour form are condensed and then collected in a condensate collection vessel. Valves are arranged at the appropriate points, and these can optionally be controlled automatically to ensure proper functioning.

WO 2009/065384 A2 proposes, inter alia, resublimating sublimable gases on a cooled, horizontal plate, from where said gases are blown out. From a thermodynamics point of view, this prior publication describes a process in which a solid transitions directly into a gas and is resublimed as a solid on the cooling plate by means of cooling. According to this prior publication WO 2009/065384 A2, the resublimation can take place both in a sublimator in the form of a cooled plate and in a downstream pocket filter, which is known from the prior art.

According to the above prior publication, corresponding substances in the gas are resublimed in a first stage in powder form, in order to then filter out in a subsequent stage the additional remaining contents that cannot sublime. This is because in commercial film production systems it is not only pulverulent resublimate that occurs in a vacuum separator, but also mixtures consisting of liquid and paste-like components and of a very low proportion of solid and pulverulent contents.

It is further noted that redundant systems generally belong to the prior art and for example allow individual components to be serviced while the system per se can continue to operate.

In the known solutions, dirty components can only be serviced over relatively long periods for reasons of costs. Regardless of the appearance of the deposits, a drop in the efficiency of the separators, such as solids separators, condensate separators or sublimate separators, can be observed during these periods.

Therefore, the object of the present invention is to provide an improved device for degassing melts that prevents the existing drawbacks. In particular, another object of the invention is to provide improved vacuum separators to allow deposits consisting of mixtures of solid, liquid and/or paste-like components to form herein during operation and within the servicing periods of the entire production system.

The object is achieved according to the invention according to the features stated in claim 1. Advantageous embodiments of the invention are provided in the dependent claims.

The present invention provides a significantly improved device for degassing melts, i.e. in particular polymer melts. This is achieved by an improved separation device.

Within the scope of the invention, the efficiency of the process to be carried out by the device according to the invention can also be significantly improved. Furthermore, as a result of the present invention, the service life of the vacuum system and thus in particular that of the vacuum pump provided in the vacuum system can be increased and problems with disposal that exist in the prior art can be eliminated.

According to the invention, this is achieved inter alia by the use of cooling tubes, i.e. immersion tubes, which allow for optimum cooling and cleaning.

The cooling tubes according to the invention have a double-wall design and allow for a cooling process at the external wall of the cooling tubes according to the counter-flow principle. In the process, cooled medium flows inside the inner wall of the cooling tubes from one end to the other in order to then flow back again via an inner return tube located in the cooling tube.

Cleaning devices, for example in the form of a cleaning scraper, which are accordingly positioned in a form-fitting manner on the outer circumference of the cooling tubes, can be then be used from time to time to rid the cooling tubes or immersion tubes of dirt as necessary.

A second cooling means for the vacuum separator container can also be provided, said means contributing to further cooling. In the process, the cleaning apparatus can also preferably be moved simultaneously in a form-fitting manner on the inner wall of the container in order to also clean deposits from said inner wall.

The ends of the cooling tubes are preferably free ends, and in particular are spaced apart from a floor. This allows solid, paste-like or liquid deposits adhering to the outer surface of the cooling tubes to be optimally scraped off downwards towards a collection means.

It has also proven advantageous if the dirty waste gases are supplied to the vacuum separator via a gas inlet at the bottom thereof and discharged again via a gas outlet at the top. In this case, the gas inlet can preferably be provided below the bottom, preferably free ends of the cooling tubes. Unlike in the prior art, this also prevents the deposits which are contained in the gas flow and adhere to the cooling tubes from clogging up the flow space in the lower region of the cooling arrangement when the gases flow in, as a result of which the required vacuum would be interrupted much more quickly. For this reason, it has hitherto always been provided in the prior art for the gas to always enter and exit the separation container at approximately the same height, in particular in the upper region thereof. This is because the tube bundles provided in the prior art would be become clogged by the deposits and the efficiency of the separation would thus be reduced. As a result, in a filtering process having two or more filter stages, substances that are not deposited would then still enter the next filter stage and, for example, clog up the pocket filter used therein in the second filter stage, because if gas entered the lower region of the separation container in the solutions known from the prior art, this would cause rapid and premature clogging of the tube bundle provided therein.

Having the gas inlet at the bottom also provides the advantage that at least some of the liquid and solid constituents in the gas flow can be separated as a result of gravity alone, without the tube bundle provided in the prior art being at risk of becoming clogged by these substances in the region of the gas inlet arranged at the bottom. Preferably, these constituents can fall onto the container floor in the receiving region and can be removed automatically or manually through a cleaning opening preferably provided at the bottom or on the side.

In a preferred embodiment, another separation means or what is referred to as a separation partition is provided above the cleaning opening and allows the collection means, in which the solid, paste-like or fluid substances are deposited during operation and/or the cleaning process, to be emptied while maintaining the vacuum in the vacuum separator.

Preferably, the gas flows against the cooling tubes from below. A basic advantage is that the surfaces involved in the heat transfer are utilised to a maximum. The free vertical flow against the tubes also prevents dirt residues from narrowing the flow cross section in this region, as would otherwise occur with a horizontal flow. Therefore, the cooling tubes are preferably arranged vertically or deviate from the vertical by less than 45°, in particular by less than 30°, or less than 15°.

In summary, it can thus be noted that, inter alia, the invention aims to prolong the availability of the at least one separator or of the plurality of separators. The solution provided specifically within the scope of the invention, whereby the heat exchange tubes are arranged so as to be offset downwards in the form of immersion tubes, allows the heat exchange surfaces to be completely cleaned.

Conventional tube bundles are closed downwards by tube bends or collecting plates. The surfaces are prevented from being cleaned by the dirt residues being retained on these horizontal surfaces or shoulders and the tubes are thus only cleaned to an incomplete extent. This results in the useful life of the separator being reduced by the flow surface becoming increasingly smaller.

The particular arrangement of the heat exchanger provides a surface which is similar to that in conventional tube bundles, yet it allows the entire surface to be cleaned using a simple mechanical device. This particular arrangement allows the separated gas constituents to be discharged from the process chamber without any residues.

In principle, the invention proposes a cleaning device which can be controlled manually, by means of a motor, or pneumatically, as required, and in which a cleaner can be moved from its upper position into its lower position in order to scrape off the liquid, paste-like and solid and/or pulverulent deposits towards the container floor. The force is applied via appropriate drives that are fundamentally known in the art. A wiper used within the scope of the invention can also have a segmented design in order to ensure continuous cleaning even without a redundant system. In a non-redundant configuration, partial cleaning is achieved preferably by means of wipers or wiper plates that are arranged at an offset, and this configuration simultaneously ensures that there is always a sufficiently large cross section open for the flow. When the separator is configured in a redundant manner, the temperature-controlled tubes can be cleaned completely using a special plate adapted to the tubes. The specific arrangement of the temperature-controlled tubes allows for optimum cleaning, without dirt residues being retained on the horizontal surfaces or shoulders.

Further advantages, details and features of the invention emerge from the embodiments explained with reference to the drawings, in which in detail:

Figure 1:
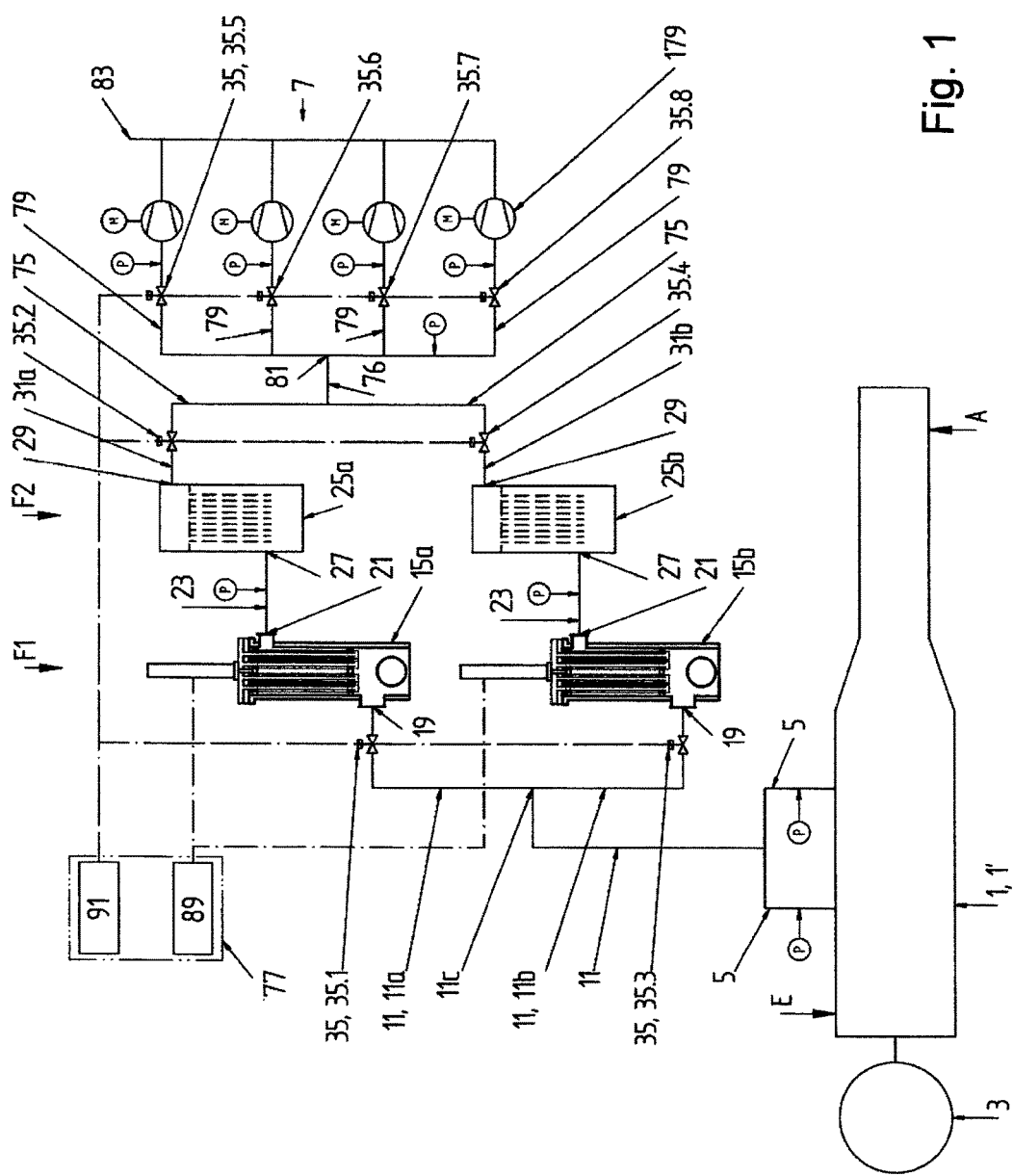
FIG. 1 is a schematic overall view of a device according to the invention for degassing polymer melts.

In the following, the basic overall design of the device for degassing polymer melts is explained with reference to FIG. 1.

The system as a whole comprise a plasticising unit 1 which is generally in the form of an extruder 1' and is driven, for example, by a motor 3.

Said plasticising unit 1 can be supplied with solid or liquid plastics material via a filling funnel (not shown in more detail in FIG. 1), e.g. in a supply region E.

Liquid and/or solid additives are typically added to the plastics material. This can take place, for example, as early as in the region of the filling funnel. In some applications, the plastics material and additives can in fact be mixed externally even before being input into the funnel, i.e. before being introduced into the plasticising unit 1.

The admixed additives can be various chemical compositions, e.g. plasticisers, anti-static agents, pinning additives, etc.

As is known, a corresponding plasticising unit 1, for example in the form of an extruder 1', typically comprises at least one or generally two (or more) plasticising screws. Said at least one plasticising screw (not shown in more detail in FIG. 1) of the plasticising unit 1 optionally allows the plastics material supplied to the plasticising unit 1 to be stirred and optionally mixed with the supplied additive, optionally with the aid of heating means or electric band heaters. At the same time, the plastics material is melted. The plastics melt enters the region of one or more vacuum regions 5 in the system as a whole. Generally, the inner chamber, which is filled with the melt, of the plasticising unit 1 is connected to a vacuum region 5 via a corresponding opening in the housing. Finally, the plastics material which is supplied to the plasticising unit, for example at the aforementioned input E, is discharged in molten form at an output A.

In the above-mentioned one vacuum region 5 or in the possible plurality of vacuum regions, the melt is degassed. For this purpose, a vacuum line and/or degassing line 11 is provided.

This line connects the vacuum region 5 to the vacuum system 7, which preferably comprises a plurality of vacuum pumps, by means of additional filter stages and means, which are to be explained further later, and by means of additional line portions. The temperature of the vacuum line and/or degassing line 11, which, in the embodiment shown according to FIG. 1, leads to the two vacuum separators 15 depicted therein, can additionally be controlled, for example to a temperature of 150° C. to 300° C. in order to exclude, to the greatest possible extent, the possibility of condensation (and/or sublimation) of the waste gases as early as in this pipeline. The vacuum line is additionally distinguished in that melt is prevented from entering the vacuum line from the plasticising unit by means of a special device (melt trap).

The vacuum separator 15 mentioned above and shown schematically in FIG. 1 is primarily used to filter out solids, but optionally also to separate liquid or at least viscous, paste-like materials and substances.

In the embodiment shown, which is not obligatory but is advantageous, the system has a generally redundant overall design.

For this purpose, in the embodiment explained with reference to FIG. 1, two vacuum separators 15a and 15b are provided instead of just one vacuum separator 15, and these can be directly connected to the vacuum region 5 (or to different vacuum regions 5) via two vacuum degassing lines 11, 11a and 11b, or, as in the embodiment shown, they pass, at a branching point 11c, into the two parallel vacuum degassing lines 11, 11a, 11b, which lead to the two vacuum separators 15a, 15b.

The structure of the vacuum separator 15, 15a, 15b will be explained in detail in the following.

It can already be seen from FIG. 1 that each of the vacuum lines and/or degassing lines 11, 11a, 11b leads to a gas inlet 19. A vacuum separator of this type can also be referred to as a sublimation and/or condensate separator 15. In this separator 15, the constituents, in vapour form, of the gas are separated i.e. in particular condensed, on a special arrangement according to the invention which will be described in detail below. Solids and possibly fluid or viscous substances can thus be separated from the gas.

The above-mentioned vacuum separator(s) 15, 15a, 15b more or less constitute a first filter stage F1, which, as mentioned, preferably has a redundant design, in order to allow solid, paste-like and liquid waste substances to be removed without difficulty during the servicing intervals. The waste gases cleaned in this respect can then be supplied to a downstream second filter stage F2 by means of a corresponding connection line 23 via a gas outlet 21 on the respective vacuum separator 15. In the embodiment shown, the filter stage F2 also has a redundant design and comprises in each case a second filter stage F2 which is arranged downstream of the respective vacuum separator 15a and 15b, respectively, via a respective connection line 23.

The two redundant filters 25, i.e. in the embodiment shown those provided in parallel with one another and connected to the upstream vacuum separator 15a, 15b in each case, i.e. filter 25a and 25b of the second filter stage F2, clean the waste gases again. The gas, which is supplied via the gas inlet 27 thereof and has already been pre-cleaned in part by the vacuum stage, flows through said filter stage in order to then be supplied, at the associated gas outlet 29, to the actual vacuum system 7 via a respective outlet line 31, i.e. in the embodiment shown the outlet lines 31a and 31b, respectively, via which line the gases are pumped out. A more detailed description of the structure thereof will be provided later.

As mentioned, the system overall preferably has a redundant design in each case in order to allow the solid, paste-like and liquid waste substances to be removed during the servicing intervals. In this context, the system can be controlled by means of valves 35, and specifically by means of a controller which is routine in principle for a person skilled in the art and forms a part of an overall central control system.

Structure of the Separator

In the following, a first embodiment of a vacuum separator 15 according to the invention will be explained with reference to FIG. 2.

The shown vacuum separator 15, 15a, 15b comprises a double-wall vacuum separator housing 115, which comprises an outer container wall 115a and an inner container wall 115b at a spacing therefrom. This double-wall system produces a housing intermediate space 115e, and this allows the temperature of the vacuum separator housing 115 to be controlled i.e. reduced, by means of a liquid coolant flowing therearound. In this case, the coolant can be supplied to the housing intermediate space 115e of the double-wall housing 115 via a coolant supply line 37, it being possible for said coolant to flow out via a coolant discharge line 39. As in the embodiment shown according to FIG. 2, both the coolant supply line 37 and the coolant discharge line 39 can, for example, be provided in the upper region of the vacuum separator housing 115, preferably on opposite sides of the housing.

In addition, a further coolant supply line 41 and a further coolant discharge line 43 are provided and are used to cool a plurality of cooling tubes 45 extending in parallel alignment in the container inner chamber 115c, the temperature of said tubes also being controlled, i.e. reduced, by means of a liquid coolant. Any known coolant, including media which balance temperature gradients and media based on evaporative cooling, etc., can be used as the temperature control medium for cooling both the double-wall container and the cooling tubes. There are no restrictions in this respect. It is also possible for the coolant for cooling the outer wall of the container and the coolant for the cooling tubes to be supplied via a common supply line and to be discharged via a common discharge line. The supply line and discharge line can be interconnected in any other manner.

The cooling tubes 45 are designed as double tubes and each comprise an outer tube 45a and an inner tube 45b which is located inside the outer tube 45a at a spacing therefrom and has a smaller outer diameter than the inner diameter of the outer tube 45a. The outer tube 45a is closed at its bottom end 45'a, the bottom end 45'b of the inner tube 45b terminating in an open manner before the bottom closed base 45'a of the outer tube at a spacing therefrom. This establishes a circulation connection 45c which allows appropriate coolant to flow into the outer tube preferably at the top end 45' of the cooling tubes 45 via the cooling tube coolant supply line 41, and to flow through the outer tube 45c in the longitudinal direction, i.e. to flow in the space 145 between the inner wall of the outer tube 45a and the outer wall of the inner tube 45b. The coolant then flows as far as to the bottom end 45'b of the inner tube 45b and from there into the inner tube 45b via the circulation connection 45c in order to rise upwards in the inner tube 45b in the opposite direction. The coolant can then be returned to a common cooling circuit via the return flow opening 45d located at the top end—in the embodiment shown via corresponding connection points into a common return line 46 leading to the aforementioned coolant discharge line 43. In principle, the coolant could also be supplied via the inner tube and can rise up inside the outer tube at the bottom end. However, the reverse variant is preferred for achieving a better cooling effect.

It can also be seen from the embodiment that the cooling tubes 45 are preferably arranged so as to extend vertically, it also being possible in principle, however, to arrange said tubes such that they extend at least at a slight angle yet in parallel with one another. However, the deviation from the vertical should be not more than 45°, preferably less than 30°, and in particular less than 15°.

In the process, the aforementioned parallel cooling tubes form what is known as a tube bundle heat exchanger, the cooling tubes 45 which the tube bundle heat exchanger comprises also being referred to as immersion tubes 45 in this respect.

In the embodiment shown, the cooling tubes, which are closed at the bottom end, terminate before the lower container floor 115d at a spacing H (FIG. 2) therefrom. In this container floor 115d or in a side wall portion of the housing 115, preferably in the region below the bottom edge 45d formed by the closed cooling tubes 45, there is a cleaning opening 51 for removing, as required, the deposited solid, paste-like and/or liquid substances, and possibly also viscous substances, from the container.

In the embodiment shown, the aforementioned gas inlet 19 is below the bottom end of the cooling tubes 45, i.e. below the bottom edge 45d of the cooling tubes 45. The gas outlet, however, is preferably provided in the upper region of the housing 115, preferably in a region in the top quarter of the overall height of the vacuum separator housing 115.

In the following, the action of this separator means will be discussed.

The dirty waste gases reach the vacuum separator 15, 15a, 15b via the aforementioned vacuum line(s) and/or degassing line(s) 11, 11a and 11b (the temperature of which can also optionally be controlled) and the respective subsequent gas inlet 19. The gas entry 19 thus takes place at the bottom of the vacuum separator or in the lower region of the vacuum separator 15. In the embodiment shown, the aforementioned cooling or immersion tubes 45 are not positioned in the direct inflow direction, i.e. not adjacent to the gas inlet 19, but rather thereabove. This first prevents the aforementioned tube bundles of the aforementioned cooling tubes 45 becoming clogged in an undesirable manner as a result of the substances contained in the gas flow, whereby the efficiency of the separation would be reduced.

The above-mentioned gas inlet 19 located at the bottom is also advantageous in that liquid and solid constituents in the gas flow can be separated by means of gravity alone and settle in the collection means or collection space 57 located below the cooling tubes, without clogging the cooling tubes 45. In other words, these constituents thus fall onto the container floor 115d, adjacent to which, in a side wall of the housing 115, the cleaning opening 51 is located, it being possible to close said opening for example by a cover or a flap. In principle, it would also be possible to provide what is referred to as a separation partition 59, which is represented by a dashed line in FIG. 2 and is located above the cleaning opening 51 on the one hand, and below the gas inlet 19 on the other hand, in order to allow the deposited material to be cleaned away even during operation. Said separation partition 59, i.e. the corresponding separation means 59, could also be closed in a vacuum-tight manner as required so as to open the cleaning opening 51 and to remove the deposited substances from the collection chamber 57 even during operation, i.e. without the vacuum collapsing in the lines and in the filter stages. The opening 51 can then be closed again and the separation partition 59 reopened.

Since, in addition, the gas flows against the cooling tubes from the bottom upwards, i.e. at least approximately or almost over the entire length of the cooling tubes 45, the heat exchange on the involved surfaces is utilised to a maximum. The free vertical flow also prevents dirt residues from narrowing the flow cross section in this region, as would otherwise occur with a horizontal flow.

As it flows through the vacuum separator 15 from the bottom gas inlet 19 in parallel with the inner wall of the double-wall housing 115 and in parallel with the outer circumferential surfaces of the plurality of cooling tubes 45, the gas flow is cooled significantly overall, and this causes solids contained in the gas flow to settle on the surface of the cooling tubes (if they do not fall directly vertically downwards into the collection chamber 57). In the same way, sublimed and/or condensed substances in the solid or fluid state, possibly also in a viscous and thus paste-like state, can settle on the surface of the cooling tubes 45, before the gas, which has been cleaned in part in this manner, is then supplied to the second filter stage F2 via the top gas outlet 21.

Device for Cleaning the Heat Exchanger Tubes

To ensure continuous operation, with reduced servicing intervals, of the device for separating liquid, paste-like and solid and/or pulverulent constituents of a process gas extracted from the process part of an extruder 1' or from a plasticising unit 1 in general by means of the established vacuum, a specific cleaning device is provided for the heat exchange tubes.

Furthermore, FIG. 2 also shows another cleaning device RV comprising a cleaning drive 53, which can be used to move an axially extendable and retractable operating rod 53a, to which there is attached a scraper-like or a wiper-like operating means 61, which will also in some cases below be referred to by the shorter term of scraper or wiper 61. Said scraper or wiper 61 is adapted in a form-fitting manner to both the outer circumference and the position of the cooling tubes 45, and preferably also to the inner contour, i.e. the inner wall 115f of the vacuum separator housing 115. Said means can be, for example, a plate-shaped or blade-shaped operating means 61, which for example comprises recesses adapted to the diameter and the cross-sectional shape of the cooling tubes 45, as well as a circumferential boundary edge which is adapted to the inner wall of the container 115. Said cleaning device RV could, in theory, also be operated manually, but is preferably driven by a motor or pneumatically. For this purpose, the cleaning device RV comprises the aforementioned cleaning drive 53, which is provided with an operating rod 53a which protrudes axially and extends in parallel with the cooling tubes 45 and on the bottom end of which the above-mentioned scraper or wiper 61 is provided. This drive allows the scraper or wiper 61 to be moved back and forth in parallel with the axial extent direction of the cooling tubes 45 in the direction of the double arrow 64 in FIG. 2, i.e. from its upper position represented in FIG. 2 to its lower position 65b in the region of the bottom end of the cooling tubes 45, or even downwards beyond the end of said tubes, the liquid, paste-like and solid and/or pulverulent deposits found on the outer wall of the cooling tubes 45 and on the inner wall of the container 115 being wiped off towards the container floor 115d. For this purpose, the wiper 61 can be plate-shaped, as mentioned above.

To be able to ensure continuous operation of the whole system, various detailed solutions are possible.

For this purpose, in a preferred variant the system has a redundant design, as shown in FIG. 1, and for this purpose comprises the at least two vacuum separators 15a, 15b, which are operated in parallel. In this case, one vacuum separator 15a or 15b can be switched off for a certain time period by an upstream and a downstream valve 35.1, 35.2, 35.3, 35.4, optionally together with the downstream second filter stage F2, in order to clean the vacuum separator. In doing so, the cleaning device RV is activated and the corresponding substances are wiped off the cooling tubes and the inner wall of the housing, and then collect in the collection region 57. By opening the closable flap 51, these substances can then be removed from the vacuum separator. Meanwhile, the respective second vacuum separator continues to operate. As required, the other vacuum separator can be cleaned accordingly.

Figure 2:
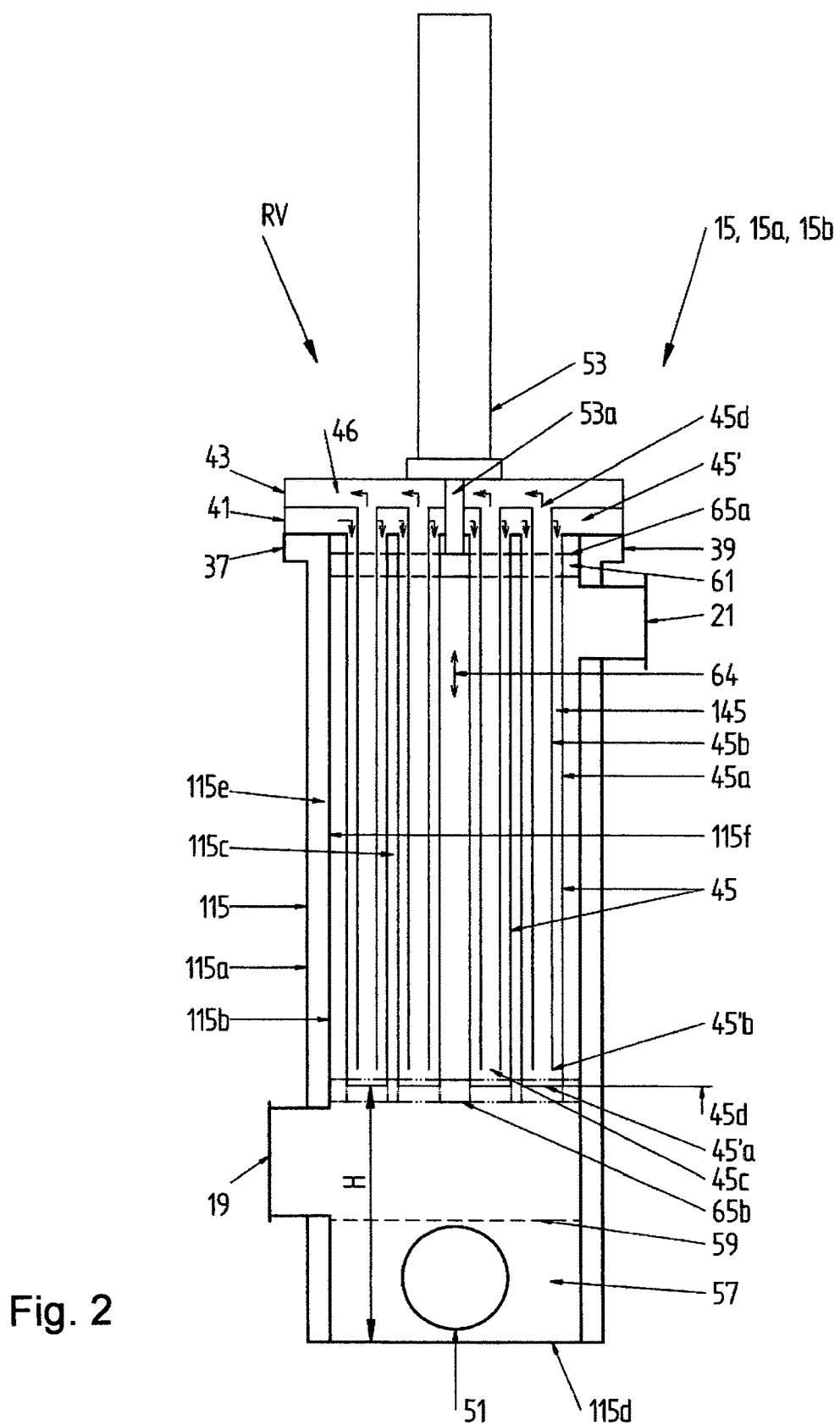
FIG. 2 is a detailed, schematic, vertical cross-sectional view through a vacuum separator according to the invention, more particularly having a redundant design.
Figure 3:
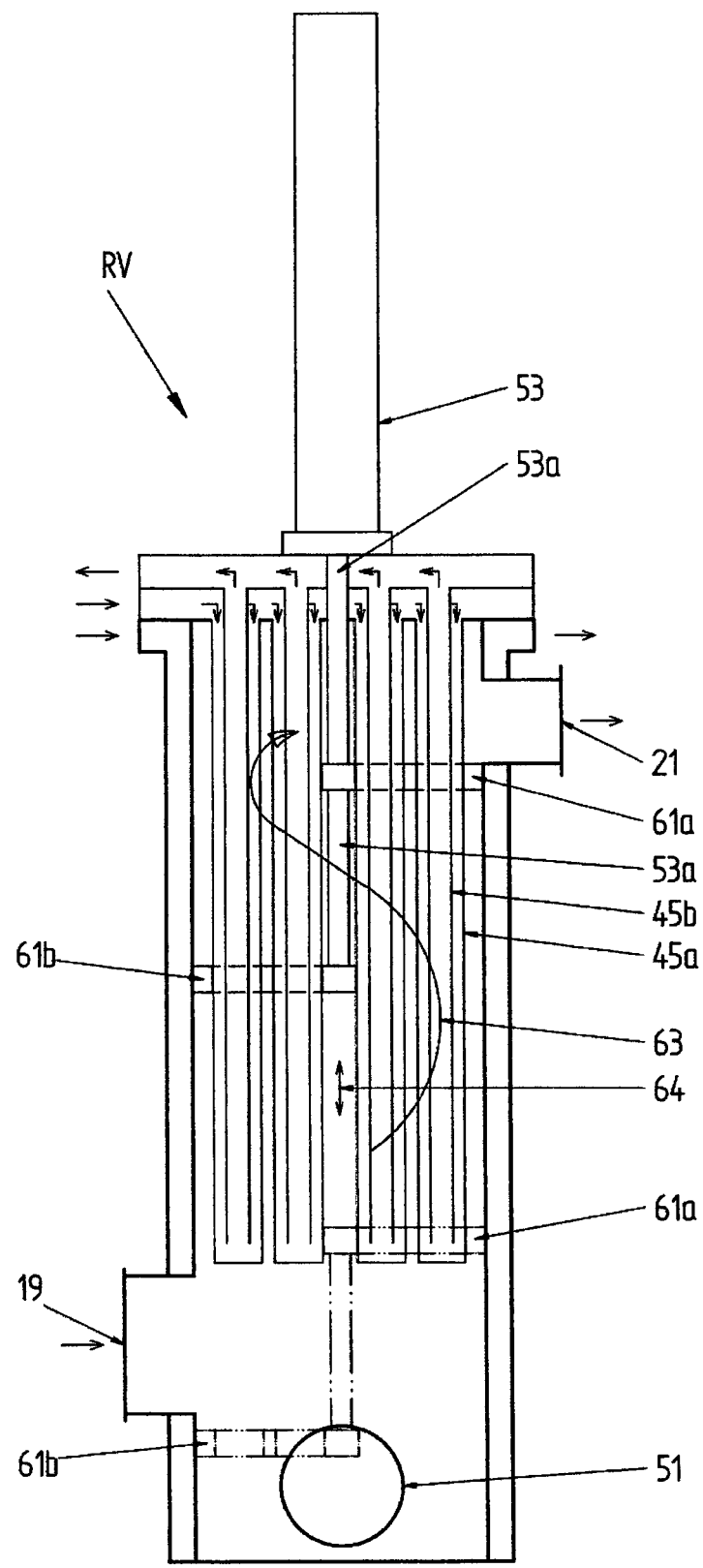
FIG. 3 shows an embodiment of a vacuum separator which differs from FIG. 2 and more particularly has a non-redundant design.

If, unlike in the embodiment according to FIGS. 1 and 2, just one single vacuum separator 15 is provided for example, an embodiment according to the view in FIG. 3 is recommended, in which the wiper 61 is divided at least into two and comprises a wiper 61a and an additional wiper 61b. Each of the two wipers 61a and 61b is, for example, assigned to half of the inner wall 115f of the housing 115 and to half of the cooling tubes 45. In this case, the two segmented wiper parts 61a and 61b are fastened to the common operating rod 53a and are raised and lowered by means of the common cleaning drive 53. However, the two sub-wipers 61a and 61b are fastened to the operating rod 53a at different heights and so as to be offset from one another in the displacement direction 64. As shown in FIG. 3, the cooling bars and the inner wall of the housing can thus be cleaned by the wiper or scraper 61 by means of the cleaning device, a constant flow channel nevertheless being open between the gas inlet 19 and the gas outlet 21, for example along the flow path 63 shown in FIG. 3. This is because, when a vacuum separator according to the embodiment in FIG. 2 is used, said vacuum separator cannot be used when the cleaning device is being operated using a wiper which is for example plate-shaped, since the flow path between the gas inlet 19 and the gas outlet 21 would be blocked when the plates of a wiping means, which is for example plate-shaped, were lowered. In the variant according to FIG. 3, at least the flow path in terms of half the cooling tube arrangement is always open.

The vertical offset between the two wiper parts 61a and 61b is of such a size that it is not only possible to displace the wiper part 61a, which is on the left in FIG. 3 and is attached lower down on the operating rod 53a, as far as to the bottom end of the cooling tubes 45, but also the wiper part 61a which is on the right and fastened at a higher point on the operating rod 53a, i.e. a certain amount further than in the second position view in relation to the two wipers 61a and 61b in FIG. 3, said depiction of the lower position showing the two wiper parts 61a and 61b before they have reached their lowest position.

Figure 4:
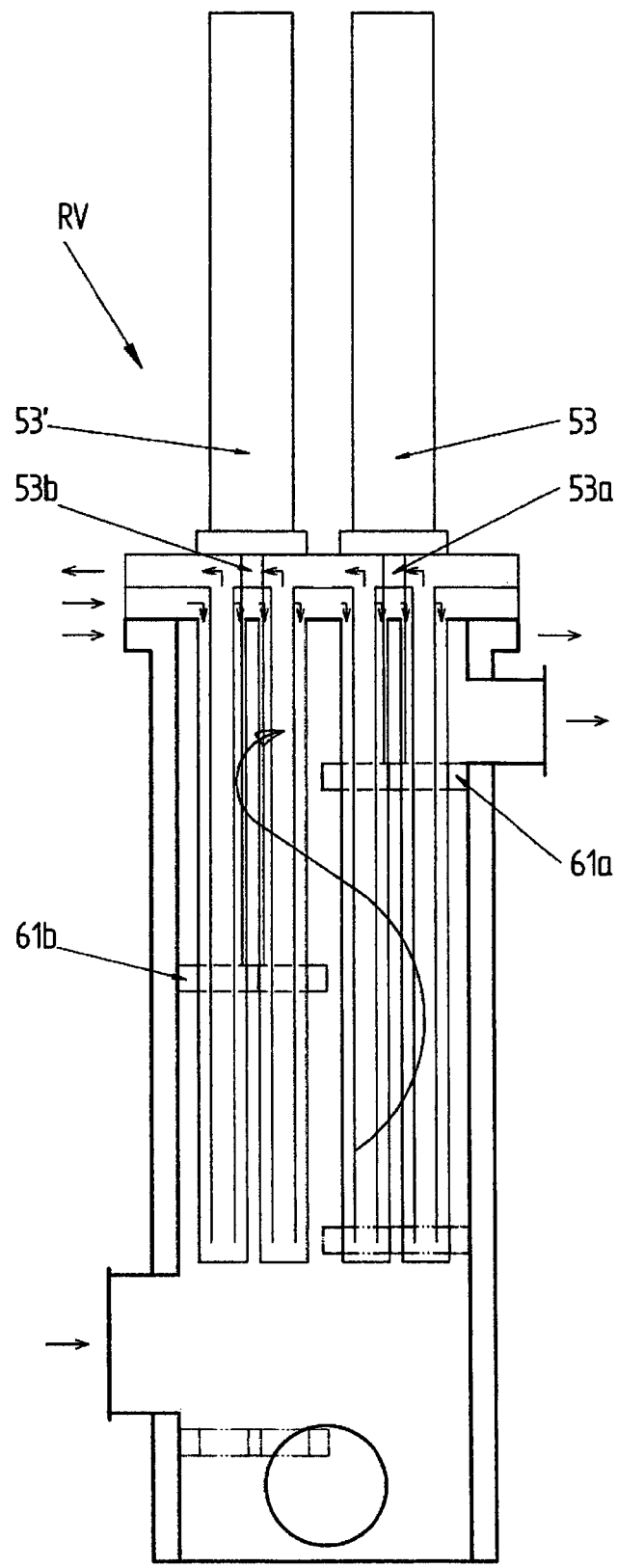
FIG. 4 is a view which again differs from the embodiment according to FIGS. 2 and 3 of a vacuum separator according to the invention, more particularly having a non-redundant design and additionally comprising two drives.

In the embodiment according to FIG. 4, a variant is shown in which two cleaning drives 53 and 53' are provided, specifically each comprising an associated operating rod 53a and 53'a. One wiper half 61a or 61b, respectively, is attached to each operating rod. Each of the two for example plate-shaped wiper halves 61a, 61b can be operated independently of the other. For this purpose, one half of the cooling tubes and one half of the inner wall of the housing can first be cleaned by operating the first cleaning drive 53, and the second cleaning device can be activated when the associated wiper half 61a has returned to its raised position in order to clean the remaining cooling tubes and the remainder of the inner wall of the housing by means of the second wiper half 61b. The half cross section inside the housing always remains open throughout the cleaning process, and therefore the gas can flow here along the cooling tubes from the gas inlet 19 to the gas outlet 21, as mentioned above. Regardless of the above explanation, the individual wiper halves 61a and 61b can also be moved independently of one another in any other pattern, the movement preferably being carried out such that the two wiper halves as far as possible never come together at the same height, since they would then close the free flow cross section.

Following cleaning, the collection region 57 can be closed upwards in a vacuum-tight manner for example by means of the aforementioned separation partition 59, such that, if more gas flows through from the gas inlet to the gas outlet, the collection chamber can be opened and the material therein can be removed while maintaining the vacuum or the negative pressure.

Further Progression of the Operating Method

If it is assumed in the following that during operation, the heat exchanger tubes become clogged by increasingly accumulating deposits, the following operating sequence can be implemented. For this purpose, a series of sensors P are provided inside the pipelines, the valves, the separators, the filters and/or the vacuum pumps themselves as shown in FIG. 1 (for example by means of motor torque measurement). If the measurement data indicate that a control threshold has been exceeded or missed, corresponding control signals can be triggered.

For example, a differential pressure measurement can be provided, which can directly measure the dirt levels on the cooling tubes 45, i.e. the immersion tubes, or in the condensate separator.

For this purpose, according to the view in FIG. 1, the two filters 25a, 25b, which are operated in parallel, in the second filter stage F2 are combined via filter output lines 75, such that the gas can flow via an additional common connection line 76 to a branching point 81 and from there via parallel vacuum lines 79 to motor-driven vacuum pumps 179, and via these, for example, to a common waste gas collection tube 83. A valve 35.5, 35.6, 35.7 and 35.8 is connected in each of said parallel vacuum lines 79, one of the above-mentioned pressure sensors P being provided in turn between the valve and the vacuum pump, which is driven by a motor in each case.

The above-mentioned control circuit 77 now makes it possible, in the case of a redundant design, to for example operate the valve controls, i.e. the valves 35.5-35.8 for switching to the respective redundant system. Likewise, one of the two pairs of valves 35.1, 35.2 or 35.3 and 35.4 can in each case be opened or closed upstream of the vacuum separator 15, i.e. 15a or 15b, respectively, and at the output of the respective filter means 25, i.e. 25a or 25b, respectively, of the second filter stage F2.

Once an equilibrium has been established in the vacuum circuit, the respective drive of the vacuum separator to be cleaned receives a particular control command via a drive 89, the corresponding valves 35 being actuated by means of a parallel drive 91. This command allows the heat exchanger tubes, i.e. the cooling tubes 45, and the internal sides of the container to be cleaned.

With a non-redundant design, the respective cleaning segment of the wiper arrangement is actuated by means of the associated drive.

The aim is to maintain a vacuum applied to the plasticising unit 1, i.e. to the extruder 1', at the same level regardless of starting material loaded with moisture, dirty filters or separators, or external influences, e.g. leaks in the system.

In this respect, a sufficient vacuum is provided from a plurality of pump sets, which themselves can each consist of up to three vacuum pumps, in a vacuum bus 79, 81. Depending on requirements, the pump sets are connected to or disconnected from the vacuum bus. It is also possible to control the vacuum level of the individual pumps depending on the load in the process gas. The vacuum pumps have a multistage design in order to prevent thermal overload. It may be advisable to provide intermediate cooling of the individual compression stages.

Following cleaning, with a redundant design, the entire system can be serviced or put back into operation. With a non-redundant design, the system continues to operate and is cleaned within the servicing intervals of the entire production system.

The invention claimed is:
1. A device for degassing polymer melts comprising:
a plasticising unit,
at least one vacuum region associated with the plasticising unit,
the at least one vacuum region being connected to a vacuum system via a vacuum line or degassing line via at least one vacuum separator, the at least one vacuum separator comprising a vacuum separator housing having a gas inlet and a gas outlet, the gas inlet being at least indirectly connected to the vacuum region and the gas outlet being at least indirectly connected to the vacuum system, the at least one vacuum separator forming a first filter stage, the first filter stage being connected to a second filter stage having at least one filter, the second filter stage being connected to and upstream of the vacuum system,
at least one first valve located between the at least one vacuum region and the at least one vacuum separator, such that the at least one first valve is connected upstream of the at least one vacuum separator, the at least one first valve being configured to move between an open position and a closed position, and
at least one pressure sensor located between the first filter stage and the second filter stage, the at least one pressure sensor measuring a pressure between the first filter stage and the second filter stage, wherein:
the at least one vacuum separator comprises cooling tubes which extend in parallel with one another in the container inner chamber of the vacuum separator housing,
the cooling tubes have a double-wall design and comprise an outer tube, in which an inner tube extends, thereby forming a space, in such a way that coolant flows into the space between the outer tube and the inner tube via an outer tube supply line, and such that, inside the outer tube, said coolant can be recirculated into the inner tube via a remote circulation connection, and from there, in the opposite direction, to a coolant outlet, or vice versa,
the cooling tubes terminate at a spacing above a collection chamber or above the container floor of the vacuum separator housing,
a cleaning device comprises a scraper or a wiper, the cleaning device being adapted to the cross-sectional shape of the cooling tubes and being movable at least in one partial vertical portion as far as to the bottom end of the cooling tubes, and
a control device is configured to drive the cleaning device based on the pressure measured by the at least one pressure sensor between the first filter stage and the second filter stage.

2. The device according to claim 1, wherein the vacuum separator housing has a double-wall design, specifically having a container outer wall and a container inner wall, it being possible to recirculate coolant between a coolant supply line and a coolant discharge line via the housing wall inner space therebetween.

3. The device according to claim 1, wherein the cleaning device comprises a wiper or scraper for cleaning the inner wall of the vacuum separator housing, or in that an additional cleaning device is provided for cleaning the inner wall of the vacuum separator housing, which device can be operated in parallel with the longitudinal extent of the cooling tubes.

4. The device according to claim 1, wherein the cooling tubes extend in parallel with one another and in the process are aligned vertically or are arranged at an angle with respect to the vertical, the angle of inclination with respect to the vertical being less than 45°.

5. The device according to claim 1, wherein the bottom end or bottom edge of the cooling tubes terminates at such a vertical spacing from the housing floor that the gas inlet is arranged below a height line formed by the bottom end or bottom edge of the cooling tubes.

6. The device according to claim 1, wherein the gas outlet is provided in the upper region of the vacuum separator housing.

7. The device according to claim 1, wherein a cleaning opening is provided in the vacuum separator housing and is arranged below the bottom end or bottom edge of the cooling tubes in the housing floor or in a side wall portion of the vacuum separator housing.

8. The device according to claim 1, wherein the cleaning device comprises a segmented wiper or scraper or a wiper or scraper that has been divided at least into two, the wiper parts or scraper parts of which are fastened to a common operating rod so as to be offset from each other in the longitudinal direction of the cooling tubes, or are movable together in the longitudinal direction of the cooling tubes.

9. The device according to claim 1, wherein the cleaning device is provided having at least two cleaning drives having at least two wipers or scrapers which can be moved separately from each other, wherein each of the two wipers or scrapers is only assigned to a part of the cooling tubes and/or the housing inner wall of the vacuum separator housing.

10. The device according to claim 1, wherein a vacuum line leading to the vacuum system is assigned in each case to the at least one filter of the second filter stage, said vacuum line leading to the vacuum system via a connection point.

11. The device according to claim 10 further comprising at least one second pressure sensor between the at least one vacuum region and the vacuum system in the region of (i) the at least one vacuum region or of the vacuum line or degassing line or (ii) in the vacuum line downstream of the second filter stage and upstream of at least one vacuum pump of the vacuum system.

12. The device according to claim 1 further comprising at least one second valve connected downstream of the second filter stage, the at least one second valve being configured to move between an open position and a closed position.

13. The device according to claim 1, wherein the control device is configured to operate the at least one first valve between the open position and the closed position based on the pressure measured by the at least one pressure sensor between the first filter stage and the second filter stage.

14. The device according to claim 1, wherein the cleaning device is adapted to a course of the inner wall of the vacuum separator housing.

15. The device according to claim 4, wherein the angle of inclination with respect to the vertical is less than 30°.

16. The device according to claim 4, wherein the angle of inclination with respect to the vertical is less than 15°.

17. The device according to claim 9, wherein each of the two wipers or scrapers is only assigned to only half the cooling tubes and/or the housing inner wall of the vacuum separator housing.

* * * * *